United States Patent [19]
Lynch

[11] Patent Number: 5,471,708
[45] Date of Patent: Dec. 5, 1995

[54] PNEUMATIC DOOR CLOSER

[75] Inventor: Bernard Lynch, Southington, Conn.

[73] Assignee: The Stanley Works, New Britain, Conn.

[21] Appl. No.: 195,303

[22] Filed: Feb. 14, 1994

[51] Int. Cl.⁶ ............................... F16F 9/02; E05F 3/02
[52] U.S. Cl. .................. 16/66; 16/72; 16/84; 92/128; 188/282; 188/322.15
[58] Field of Search .................. 16/58, 66, 69, 16/70, 72, 84, 67, 68; 92/128, 129, 30; 29/888.051; 248/565, 636; 267/64.15; 188/282, 322.15

[56] References Cited

U.S. PATENT DOCUMENTS

| | | |
|---|---|---|
| 3,028,620 | 4/1962 | Quinn . |
| 3,129,453 | 4/1964 | Turner . |
| 3,143,757 | 8/1964 | Quinn . |
| 3,160,910 | 12/1964 | Quinn . |
| 3,392,419 | 7/1968 | Stein et al. . |
| 3,413,679 | 12/1968 | Waldo . |
| 4,110,868 | 9/1978 | Imazaike ............................ 16/84 |
| 4,382,311 | 5/1983 | Watts ................................. 16/72 |
| 4,817,238 | 4/1989 | Liu ..................................... 16/66 |
| 4,920,609 | 5/1990 | Lin ..................................... 16/66 |
| 5,157,806 | 10/1992 | Wartian . |

Primary Examiner—S. Thomas Hughes
Assistant Examiner—Kenneth J. Hansen
Attorney, Agent, or Firm—Pepe & Hazard

[57] ABSTRACT

A pneumatic door closer has an elongated cylinder with a bore extending axially thereof and end walls, and a piston is slidably reciprocable within the bore. The piston is integrally fabricated of a synthetic resin with a generally circular cross section, and it has a circumferential groove adjacent one end thereof providing a neck portion dividing the axial length thereof into a head portion and a body portion. The groove has a generally radially extending wall surface on the head portion, an outwardly diverging wall surface on the body portion, and an axially extending bottom wall surface. The head portion has at least one passage extending through the head portion into the groove to allow air to flow therethrough. A sealing ring of resiliently deformable material is disposed in the groove and is of greater diameter than the piston so as to project outwardly thereof. Because the axial dimension of the groove increases radially outwardly to a dimension greater than the diameter of the ring, the ring may move axially therewithin. When the piston moves toward the door closing position, the sealing ring bears against the diverging wall surface of the groove and the wall of the cylinder to restrict flow of air thereby, and, when it moves towards the door opening position, the sealing ring bears against the generally radially extending wall surface of the groove to permit flow of air thereby.

8 Claims, 2 Drawing Sheets

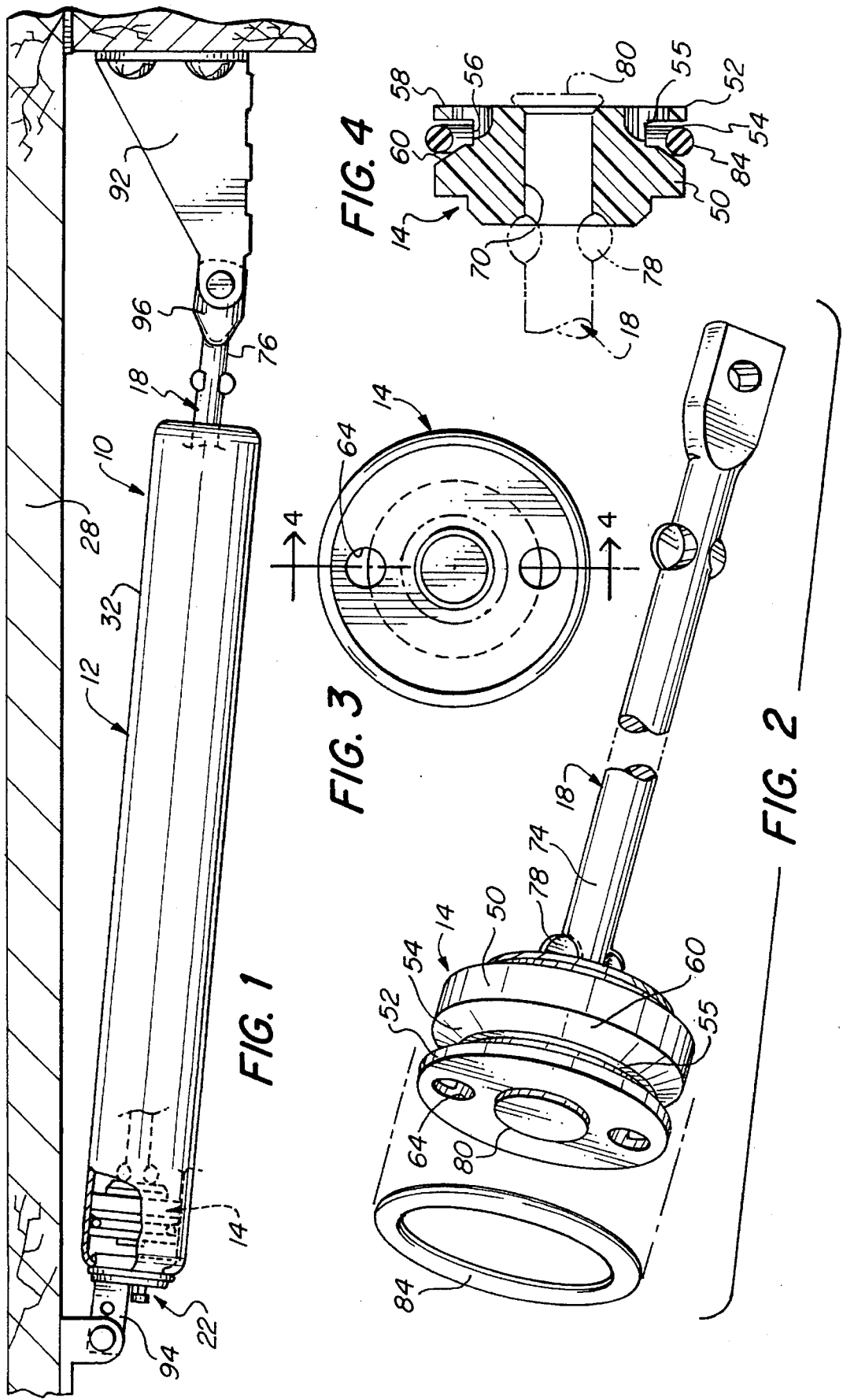

PNEUMATIC DOOR CLOSER

BACKGROUND OF THE INVENTION

The present invention relates to door closers, and more particularly, to pneumatic door closers.

Pneumatic door closers are widely used because they allow a door to be opened readily and closed more slowly to avoid striking the person passing through the door frame and to avoid impacts upon closing to minimize damage to the hinges and latch.

Some prior art door closers employ numerous parts which increase the cost of fabrication and tend to decrease life and reliability. To obtain good sealing action of the piston as it moves to the closing position requires close control over the tolerances of the piston and cylinder and of the sealing ring which is generally used. Metal pistons require accurate and frequently separate manufacturing operations such as stamping and welding, increasing cost.

Assembly of the piston from stamped metal parts generally has required welding which produces distortion, requires venting of welding fumes, and produces sparks and pinch points.

It is an object of the present invention to provide a novel pneumatic door closer which utilizes a synthetic resin piston which provides inherent lubricity.

It is also an object to provide such a door closer in which the piston is formed with accurate contours leading to optimal performance.

It is a further object to provide such a door closer in which the components may be fabricated readily and economically and readily assembled without welding to provide reliability and long lived operation.

SUMMARY OF THE INVENTION

It has now been found that the foregoing and related object may be readily attained in a pneumatic door closer for use between a door and its frame to provide controlled closing motion of the door. The closer includes an elongated cylinder having a bore extending axially thereof, a first end wall having a coaxial opening therein, and a second end wall. A piston is slidably reciprocable within the bore between a first position adjacent the first end wall and a second position adjacent the second end wall, and the piston and the cylinder define a chamber between the piston and the second end wall. The piston is integrally fabricated from synthetic resin with a generally circular cross section, and it has a circumferential groove adjacent the end thereof adjacent the second wall dividing its axial length into a head portion at its end adjacent the second end wall and a body portion, and the groove providing a neck portion therebetween. The groove is defined by a generally radially extending wall surface on the head portion, an outwardly diverging wall surface on the body portion, and an axially extending bottom wall surface. The head portion has at least one passage extending through the head portion into the groove to allow air to flow therethrough between the chamber and groove.

A sealing ring of resiliently deformable material is disposed in the groove and is of greater diameter than the piston so as to have a peripheral portion projecting outwardly thereof. The axial dimension of the groove increases radially outwardly to a dimension greater than the diameter of the ring so that the ring may move axially therewithin. When the piston moves toward the second position, the sealing ring bears against the diverging wall surface of the groove and the wall of the cylinder to restrict flow of air from the chamber thereby, and, when the piston moves towards the first position, the sealing ring bears against the generally radially extending wall surface of the groove to permit flow of air thereby into the groove and thence into the chamber. An elongated rod has one end secured to the piston and its other end extending outwardly of the opening in the first end wall. Biasing means urges the piston towards the second position.

The door closer also includes air flow control means on the cylinder allowing air to flow outwardly of the chamber in a controlled manner as the piston is moved within the cylinder toward the second position. This control means is generally located on the second end wall of the cylinder, and desirably the control means comprises a threaded aperture and a screw threadably seated therein which is dimensioned and configured to control adjustably the flow of air through the aperture by its position within the aperture.

Preferably, the piston is provided with an axial bore therethrough and the one end of the piston rod extends through the axial bore of the piston and is secured therein. Desirably, the one end of the piston rod protrudes from the bore of the piston and the protruding portion is larger than the diameter of the axial bore. The piston rod has at least one boss thereon disposed against the opposite end of the piston, and the protruding portion and the boss firmly engage the piston therebetween. The protruding portion at the one end of the piston rod and the end of the axial bore of the piston adjacent the second end wall of the cylinder are dimensioned and configured to form a substantially airtight seal. At least a portion of the boss is imbedded in the body portion of the piston to prevent rotational movement of the piston relative to the piston rod.

The biasing means is conveniently an axially elongated compression spring disposed about the piston rod and bearing against the piston and the first end wall of the cylinder.

BRIEF DESCRIPTION OF THE INVENTION

FIG. 1 is a plan view of a pneumatic door closer embodying the present invention, shown mounted between a fragmentarily illustrated door and frame;

FIG. 2 is a fragmentary perspective view of the piston and rod of the door closer, drawn to an enlarged scale, and showing the O-ring disassembled from the piston;

FIG. 3 is an end view of the piston and O-ring drawn to an enlarged scale;

FIG. 4 is a fragmentary sectional view along the line 4—4 of FIG. 3, with the rod shown in phantom line;

DETAILED DESCRIPTION OF THE PREFERRED EMBODIMENTS

Figure 5:
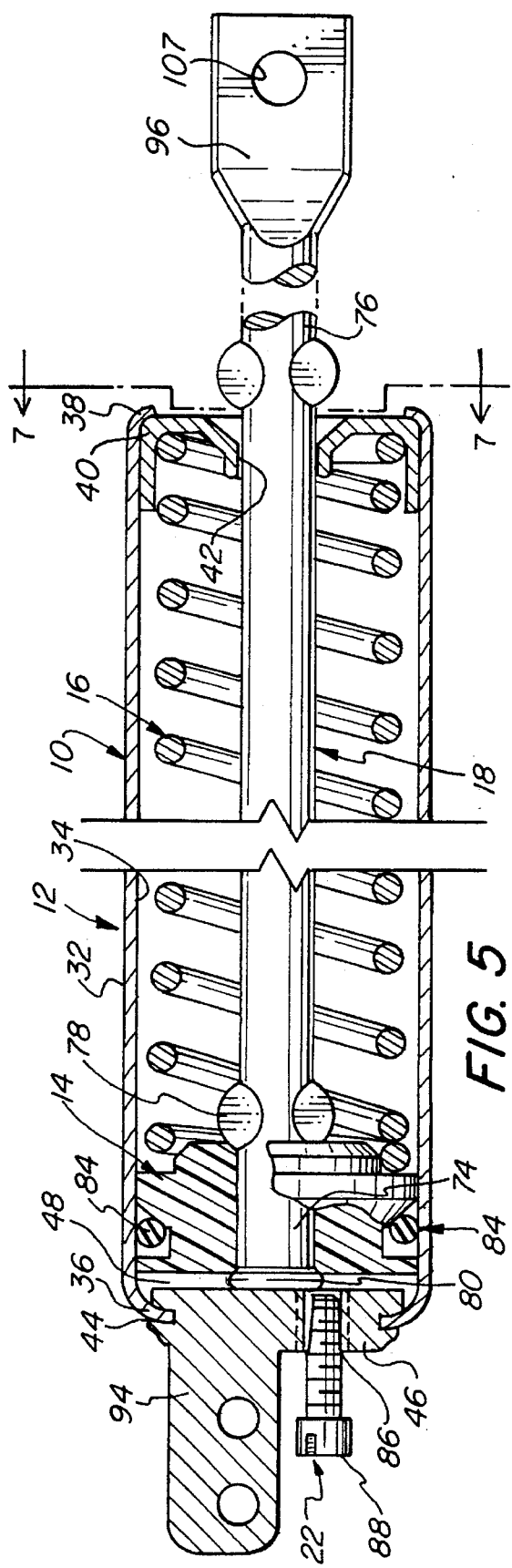
FIG. 5 is a fragmentary longitudinal sectional view of the door closer.

Turning first to FIGS. 1 and 5, a pneumatic door closer embodying the present invention and generally designated by the numeral 10 is illustrated therein as mounted between a door 28 and door frame 30. The door closer 10 has a cylinder generally designated by the numeral 12, and a piston rod generally designated by the numeral 18 which extends outwardly of the cylinder. A coil spring 16 biases the piston 14 towards one end wall member 46 of the cylinder 12, and air flow control means in the form of a bleeder valve generally designated by the numeral 22 is provided on the end wall member 46.

Figure 8:
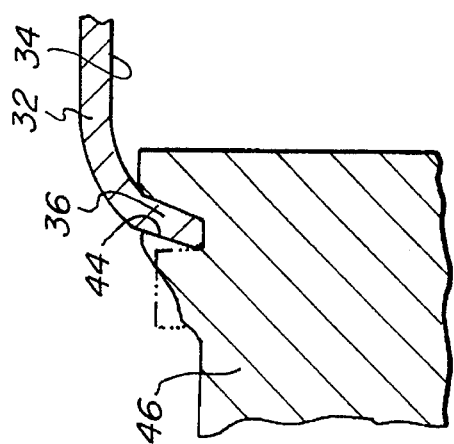
FIG. 8 is a greatly enlarged view of the air tight juncture of the cylindrical sidewall and the end wall member.
Figure 7:
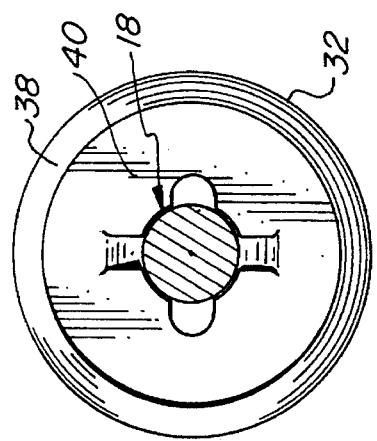
FIG. 7 is a sectional view thereof along the line 7—7 of FIG. 5.
Figure 6:
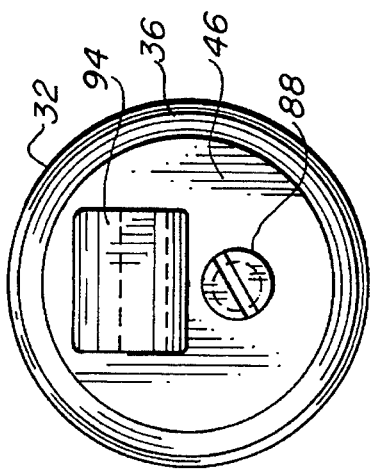
FIG. 6 is an end view of the left hand side thereof as seen in FIG. 5.

The cylinder 12 has a cylindrical side wall 32 providing an axial bore 34 and the side wall 32 has inwardly directed annular flanges 36 and 38 at its ends. The rear flange 38 seats the rear end cap 40 within the axial bore 34 of the cylinder 12. As best seen in FIG. 8, the front flange 36 seats in a peripheral groove 44 in the end wall member 46 to form an airtight seal.

The piston 14 is slidably reciprocable between a first position adjacent the rear end cap 40 in which the door 28 is in the open condition and a second position adjacent the front wall member 46 in which the door 28 is closed. The piston 14, the cylinder wall 32, and the front end wall member 46 define a chamber 48.

Referring to FIGS. 2–4, the piston 14 is integrally fabricated of a synthetic resin and has a generally circular cross section with a circumferential groove 54 adjacent the end of the piston 14 disposed towards the front end wall member 46. The groove 54 divides the axial length of the piston 14 into a head portion 52 at the end of the piston 14 adjacent the front end wall member 46 and a body portion 50, and the groove 54 defines a neck portion 55 between the head portion 52 and the body portion 50. The groove 54 has a generally radially extending wall surface 58 on the rear of the head portion 52, an outwardly diverging wall surface 60 on the front of the body portion 50, and an axially extending bottom wall surface 56. The groove 54 also has a short radial wall surface 57 extending between the diverging wall surface 60 and bottom wall surface 56.

As best seen in FIGS. 2–5, two passages 64 extend through the head portion 52 of the piston 14 into the groove 54 and allow air to freely flow from the area behind the piston 14 through the groove 54 and thence into the chamber 48 when the piston 14 moves from its open position to its closed position as the door 28 is moved from its closed position to its open position.

The piston 14 has a coaxial bore 70 through which the piston rod 18 extends, and the front end of the bore 70 is chamfered as seen in FIG. 4. The end portion 80 Of the piston rod 18 is headed to provide a shoulder which seats snugly against the chamfered surface at the front of the piston to effect a seal therewith. Bosses 78 are staked in the rod 18 on the rear of the piston 14 to lock the piston on the rod 18 against longitudinal movement, and they are embedded in the body portion 50 of the piston 14 to prevent relative rotation.

Biasing means in the form of a coiled compression spring 16 is inserted over the piston rod 18 and bears against the rear end cap 40 and the piston 14 to urge it towards its second or closing position. The piston rod 18 extends through the axial bore 34 of the cylinder 12 and its end portion 76 passes through, and is axially slidable, in the axial opening 42 of the rear end cap 40.

A sealing ring 84 of the resiliently deformable material is disposed in the circumferential groove 54 of the piston 14, and it has an outer diameter exceeding the outer diameter of the piston 14 so that its outer circumferential portion projects therefrom to make a good seal against the wall 32 of the cylinder 12. The axial dimension of the groove 54 increases radially outwardly to a dimension greater than the cross section of the ring 84 to allow its axial movement within the groove 54 as the piston 14 is moved axially.

The bleeder valve 22 is positioned in the front end wall member 46 and permits air to flow out of the chamber 48 in a controlled manner as the piston 14 is moved within the cylinder 12. The bleeder valve 22 is provided by a threaded aperture 86 in the forward end wall member 46 and an adjustment screw 88 with a complementary thread seated in the aperture 86. The adjustment screw 88 has four tapered grooves (not shown), so that outward movement of the adjustment screw 88 in the aperture 86 increases the flow of air through the bleeder valve 22.

As seen in FIGS. 1–5, an ear 94 on the front end wall member 46 allows the pneumatic door closer 10 to be pivotally fastened to the door bracket 90. Similarly, a flat portion 96 on the rod 18 allows the closer 10 to be pivotally fastened to the bracket 92 on the door frame 30.

When the door 28 is opened, the piston 14 moves from its position adjacent the forward end wall member 46 to a position adjacent the rear end cap 40. During this movement, the sealing ring 84 bears against the generally radially extending wall surface 58 of the circumferential groove 54 on the rear face of the head portion 52 so that air may pass through the apertures 64 into the chamber 48. The pneumatic door closer 10 thereby provides little resistance to the opening of the door 28.

When the door 28 is released, the spring 16 biases the piston 14 towards the closed position adjacent the forward end wall member 46. During this movement of the piston 14, the sealing ring 84 bears against the outwardly diverging wall surface 60 of the circumferential groove 54 on the front of the body portion 50 as well as against the inner surface of the wall 32 of the cylinder 12, preventing air from leaving the chamber 48 through the apertures 64 and groove 54. As a result, air can leave the chamber 48 only through the bleeder valve 22. The inability of air to escape quickly from the chamber 48 retards the movement of the piston 14 from its first position to its second position and therefore provides controlled closing motion of the door 28.

The piston is conveniently molded from low friction and long lived resins such as polyamides (Nylon 66 being preferred), polyacetals and polypropylene. The contours and the air passages may be formed during the molding operation.

This allows the piston to be formed with precision and avoids the distortion frequently encountered with pistons welded from stamped metal parts. The assemblies produced in accordance with the present invention exhibit enhanced life because of the precise formation and inherent lubricity.

Thus, it can be seen from the foregoing detailed specification and attached drawings that the pneumatic door closer of the present invention provides a piston with a contour providing optimal performance, and it may be molded integrally to close tolerances with a resulting improvement in performance. Moreover, the integrally molded piston may be fabricated readily from durable resins and economically and readily assembled to provide long lived and reliable operation.

Having thus described the invention, what is claimed is:

1. A pneumatic door closer for use between a door and its frame to provide controlled closing motion of the door, said door closer comprising:

(a) an elongated cylinder having a bore extending axially thereof, a first end wall having a coaxial opening therein, and a second end wall;

(b) a piston slidably reciprocable within said bore between a first position adjacent said first end wall and a second position adjacent said second end wall, said piston and said cylinder defining a chamber between said piston and said second end wall, said piston being integrally fabricated of a synthetic resin and having a generally circular cross section and axially spaced first and second end surfaces, said piston having a circumferential groove dividing the axial length thereof into a head portion adjacent said second end wall and a body portion with said groove providing a neck portion therebetween, said head portion and said body portion having the same diameter, said groove being defined by a generally radially extending wall surface on said head portion, an outwardly diverging wall surface on said body portion, and an axially extending bottom wall surface, said head portion having at least one passage with a closed periphery spaced inwardly from a periphery of the head portion and extending through said head portion into said groove adjacent its base to allow air to flow therethrough between said chamber and groove;

(c) a sealing ring of resiliently deformable material disposed in said groove and of greater diameter than said piston so as to have a peripheral portion projecting outwardly thereof, an axial dimension of said groove increasing radially outwardly in axial dimension to a dimension greater than the diameter of said ring so that said ring may move axially therewithin, said at least one passage being substantially unobstructed by said sealing ring, whereby, when said piston moves toward said second position, said sealing ring bears against said diverging wall surface of said groove and the wall of said cylinder thereby to restrict flow of air from said groove and thereby from said chamber, and, when said piston moves towards said first position, said sealing ring bears against said generally radially extending wall surface of said groove on said head portion to permit flow of air thereby into said groove and into said chamber;

(d) an elongated piston rod having one end secured to said piston and its other end extending outwardly of said opening in said first end wall, said piston having an axial bore extending therethrough and through which said one end of said piston rod extends, said piston rod having a portion protruding from said head portion of said piston and of a larger diameter than a diameter of said axial bore of said piston and bearing against said first axial end surface, said piston rod having at least one staked boss thereon disposed against the second axial end surface surface of said piston, said protruding portion and said at least one staked boss firmly engaging said piston and imbedded in the body portion of said piston to prevent rotational movement of said piston relative to said piston rod and to effect sealing of the bore through said piston;

(e) biasing means urging said piston towards said second position; and;

(f) means for attaching said cylinder and said piston rod to the door and its frame.

2. The pneumatic door closer in accordance with claim 1 including air flow control means on said cylinder allowing air to flow outwardly of said chamber in a controlled manner as said piston is moved within said cylinder toward said second position.

3. The pneumatic door closer in accordance with claim 2 wherein said control means is on said second end wall of said cylinder.

4. The pneumatic door closer in accordance with claim 2 wherein said control means comprises a threaded aperture and a screw threadably seated therein and dimensioned and configured to control the flow of air through said aperture by its position within said aperture.

5. The pneumatic door closer in accordance with claim 1 wherein said protruding portion of said one end of said piston rod and the end of said axial bore of said piston adjacent said second end wall of said cylinder are dimensioned and configured to form a substantially airtight seal.

6. The pneumatic door closer in accordance with claim 1 wherein said biasing means is an axially elongated coil spring disposed about said piston rod and bearing against said piston and said first end wall.

7. A pneumatic door closer for use between a door and its frame to provide controlled closing motion of the door, said door closer comprising:

(a) an elongated cylinder having a bore extending axially thereof, a first end wall having a coaxial opening therein, and a second end wall;

(b) a piston slidably reciprocable within said bore between a first position adjacent said first end wall and a second position adjacent said second end wall, said piston and said cylinder defining a chamber between said piston and said second end wall, said piston being integrally fabricated of a synthetic resin and having a generally circular cross section and axially spaced first and second end surfaces, said piston having a circumferential groove dividing the axial length thereof into a head portion adjacent said second end wall and a body portion with said groove providing a neck portion therebetween, said head portion and said body portion having the same diameter, said groove being defined by a generally radially extending wall surface on said head portion, an outwardly diverging wall surface on said body portion, and an axially extending bottom wall surface, said head portion having at least one passage with a closed periphery spaced inwardly from a periphery of the head portion extending through said head portion into said groove adjacent its base to allow air to flow therethrough between said chamber and groove;

(c) a sealing ring of resiliently deformable material disposed in said groove and of greater diameter than said piston so as to have a peripheral portion projecting outwardly thereof, an axial dimension of said groove increasing radially outwardly in axial dimension to a dimension greater than the diameter of said ring so that said ring may move axially therewithin, said at least one passage being substantially unobstructed by said sealing ring, whereby, when said piston moves toward said second position, said sealing ring bears against said diverging wall surface of said groove and the wall of said cylinder thereby to restrict flow of air from said groove and thereby from said chamber, and, when said piston moves towards said first position, said sealing ring bears against said generally radially extending wall surface of said groove on said head portion to permit flow of air thereby into said groove and into said chamber;

(d) an elongated piston rod having one end secured to said piston and its other end extending outwardly of said opening in said first end wall, said piston having an axial bore extending therethrough and said one end of said piston rod extends through said axial bore of said piston and is secured therein, said piston rod having a portion protruding from said head portion of said piston and of a larger diameter than a diameter of said axial bore of said piston and bearinq against said first axial end surface, said piston rod having at least one staked boss thereon disposed against the second axial end surface of said piston, said protruding portion and said at least one staked boss firmly engaging and imbeded in said body portion of said piston to prevent rotational movement of said piston relative to said piston rod said protruding portion of said one end of said piston rod and an end of said axial bore of said piston adjacent said second end wall of said cylinder being dimensioned and configured to form a substantially airtight seal;

(e) an axially elongated coil spring disposed about said piston rod and bearing against said piston and said first end wall to urge said piston towards said second position;

(f) air flow control means on said cylinder allowing air to flow outwardly of said chamber in a controlled manner as said piston is moved within said cylinder toward said second position and;

(g) means for attaching said cylinder and said piston rod to the door and its frame.

8. The pneumatic door closer in accordance with claim 7 wherein said control means is on said second end wall of said cylinder, and said control means comprising a threaded aperture and a screw threadably seated therein and dimensioned and configured to control the flow of air through said aperture by its position within said aperture.

* * * * *